US012625851B2

(12) United States Patent　(10) Patent No.:　US 12,625,851 B2
Walker　(45) Date of Patent:　May 12, 2026

(54) SYSTEM FOR INTERCONNECTING DATA MANAGEMENT FOR SCIENTIFIC RESEARCH WITH A REGISTRY FOR PUBLISHING OF QUALITY-CONTROLLED DATA

(71) Applicant: Lifetime Omics, Inc., Miami, FL (US)

(72) Inventor: John T. Walker, Berkeley, CA (US)

( * ) Notice: Subject to any disclaimer, the term of this patent is extended or adjusted under 35 U.S.C. 154(b) by 0 days.

(21) Appl. No.: 18/900,840

(22) Filed: Sep. 29, 2024

(65) Prior Publication Data

US 2026/0093673 A1　Apr. 2, 2026

(51) Int. Cl.
*G06F 16/215*　(2019.01)
*G06F 16/22*　(2019.01)
*G06F 16/25*　(2019.01)
*G06F 16/28*　(2019.01)

(52) U.S. Cl.
CPC ............ *G06F 16/215* (2019.01); *G06F 16/22* (2019.01); *G06F 16/258* (2019.01); *G06F 16/285* (2019.01)

(58) Field of Classification Search
CPC .... G06F 16/215; G06F 16/258; G06F 16/285; G06F 16/22
See application file for complete search history.

(56) References Cited

U.S. PATENT DOCUMENTS

| | | | |
|---|---|---|---|
| 11,288,241 B1 * | 3/2022 | Merritt ................. | G06F 16/212 |
| 2013/0006976 A1 * | 1/2013 | Megler ................. | G06F 16/242 |
| | | | 707/723 |
| 2020/0104069 A1 * | 4/2020 | Zhu ........................ | G06F 3/067 |
| 2020/0279623 A1 * | 9/2020 | Ozeran ................. | G06F 16/215 |
| 2021/0074400 A1 * | 3/2021 | Feuerstein ............ | G06F 3/0481 |
| 2023/0060252 A1 * | 3/2023 | Bly ......................... | G06N 7/01 |
| 2023/0153284 A1 * | 5/2023 | Walters ............. | G06F 16/24578 |
| | | | 707/741 |
| 2023/0342358 A1 * | 10/2023 | Shiran ............... | G06F 16/24542 |
| 2023/0376496 A1 * | 11/2023 | Jacob ................... | G06F 16/285 |
| 2023/0385252 A1 * | 11/2023 | Cai ..................... | G06F 16/2365 |
| 2023/0410956 A1 * | 12/2023 | Gladstone ............. | G16H 10/20 |
| 2024/0086380 A1 * | 3/2024 | Vittal ................... | G06F 16/215 |
| 2024/0126816 A1 * | 4/2024 | Issa Garcia ........... | G06F 16/221 |
| 2024/0220512 A1 * | 7/2024 | Brimer ................. | G06F 16/278 |
| 2024/0281419 A1 * | 8/2024 | Alfaras ................ | G06F 16/215 |
| 2024/0281453 A1 * | 8/2024 | Tarmazdi ............. | G06F 16/152 |
| 2024/0289304 A1 * | 8/2024 | Shanmuganathan ........................ |
| | | | G06F 16/185 |
| 2025/0045257 A1 * | 2/2025 | Wu ................... | G06F 16/24537 |
| 2025/0077577 A1 * | 3/2025 | Saha ......................... | G06F 7/14 |

* cited by examiner

*Primary Examiner* — Huawen A Peng

(74) *Attorney, Agent, or Firm* — Robert Brownstein

(57)　ABSTRACT

The invention is a registry in the cloud that stores metadata and quality control metadata for scientific studies and data-sets that it has profiled with an AI-based quality control engine that runs in the data contributor's environment.

19 Claims, 7 Drawing Sheets

103

102　　　101

501

502

Study Data
Registry

SYSTEM FOR INTERCONNECTING DATA MANAGEMENT FOR SCIENTIFIC RESEARCH WITH A REGISTRY FOR PUBLISHING OF QUALITY-CONTROLLED DATA

TECHNICAL FIELD

The invention is an online cloud-based registry that interoperates with externally hosted scientific data and users to facilitate cooperative data quality control and sharing.

BACKGROUND OF INVENTION

Scientific research often encounters difficulties in data sharing due to incompatible formats, security concerns, and lack of centralized platforms. This hinders collaboration and slows down scientific discoveries, especially in the era of artificial intelligence which requires access to large amounts of data. There is a need to centralize the metadata of quality data so that users can contribute information about their quality research to that centralized registry where these and other users can find and seek out use of quality data located in myriad locations.

BRIEF DESCRIPTION OF INVENTION

The invention is meant to facilitate the centralized registry of quality-controlled scientific data regardless of where it is stored. The invention system is a distributed system comprising two subsystems, a registry environment in its own cloud, and a quality control application installed in a scientific user's data-management environment. Users interact with these systems via browser/internet user interfaces.

It is operative to seamlessly interoperate with external scientific data-management systems and repositories in order to begin centralizing a registry of disparately located scientific data so that research users can centrally register data they own and, these research users, or others, can centrally query metadata needed to efficiently locate data and complete current or future research projects.

The system is operative to enable data contributors to register and provide information about research data they wish to contribute, the study that generated the data, then quality control the data to be contributed before putting its metadata in a centralized registry.

A researcher who wants to find needed data would then have a registry providing metadata with study, data and data quality-control information related to that data. A researcher upon reusing and improving the quality of the data may register the reused and curated data in the registry becoming a data contributor. A researcher may also collaborate with data contributors in collaboratively curating the data or in a new study that reuses the data.

There is no effective way to actually centralize scientific data because it resides in myriad, disconnected stores. But, there is a way to centralize information about that data that helps researchers find what they need, regardless of where it resides, and seek access permissions, offer financial support, and/or offer collaborative support.

DETAILED DESCRIPTION OF INVENTION

Figure 1:
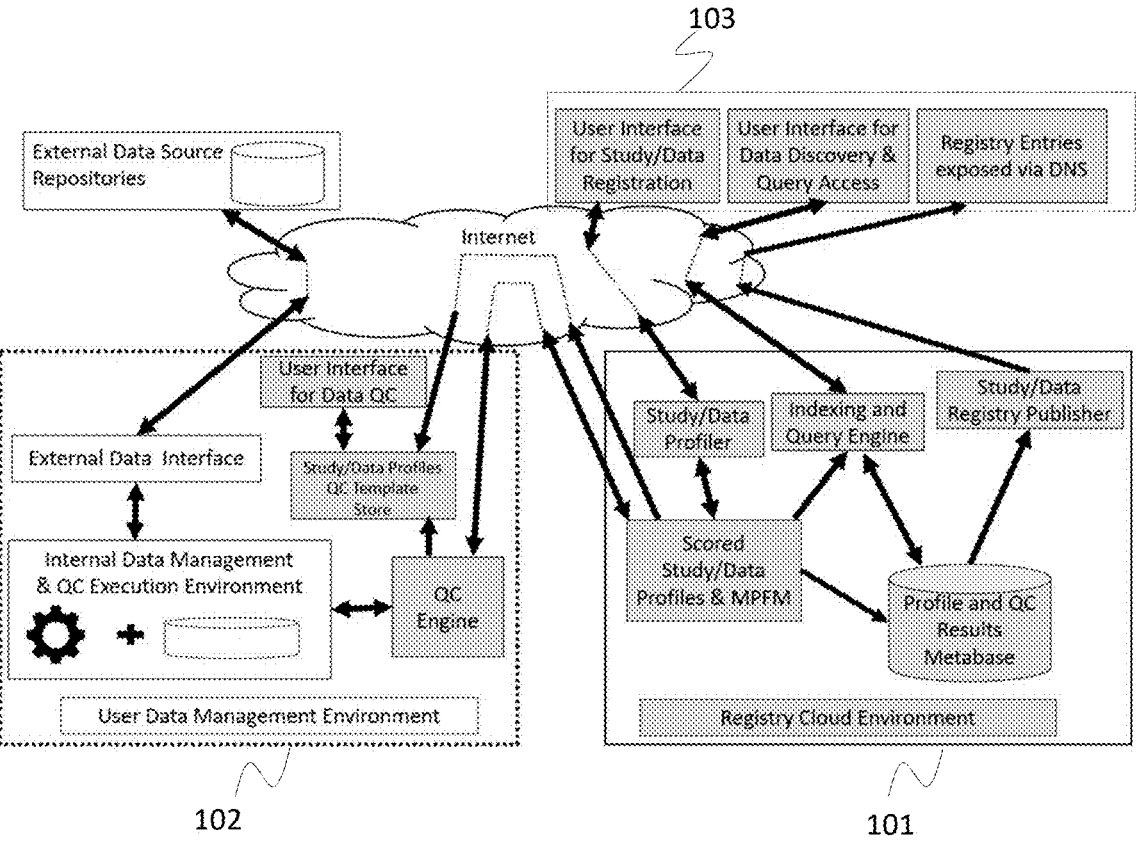
FIG. 1 shows an embodiment of the system.

Scientific progress and breakthroughs in the era of artificial intelligence (AI) rely on quality data, data sharing, and collaboration but the process for doing so is confounded by a lack of centralized dataset information and the unknown quality or value of the data.

The reality is that scientific datasets may be stored on myriad systems in an inherently decentralized environment. Even information about those datasets is inherently decentralized. As a result, researchers in need of critical dataset information may have to rely more on serendipity rather than an efficient means of discovery and permissions.

The invention herein disclosed is aimed at offering a means of secure collection of dataset metadata, making sure the data is quality-controlled, and preserving the manifestations of data governance to which some datasets must adhere.

Attempting to centralize the storage and access of datasets would be a long-term and herculean endeavor. But, providing a means for centralizing information about these disparate datasets can be done. It requires a system and method for contributing dataset information, or metadata, to a centralized registry, a means of evaluating the quality of the data, a means of discovering such metadata along with streamlined, secure means of offering funding, and/or seeking collaboration and communication with the data contributors.

To that end, the system disclosed acts like an intermediary system that offers a way to contribute information about datasets, to seek information about datasets, and to do so in a predictable, orderly, quality-controlled way. Prospective data contributors and dataset seekers must meet qualifications in order to make use of the system. Data governance aspects are respected and preserved. The system facilitates communication between dataset owners and dataset seekers but does not interfere in the process.

In order to do this, a registry of contributed study and dataset metadata needs to interface elegantly with existing, external data management systems where that data is carefully quality checked, so that dataset seekers can identify datasets and evaluate the potential success of planned research processes using the identified datasets.

In the pre-Internet world, this system would have been essentially impossible to implement because it would have required myriad, direct, interfaces to the myriad dataset stores and their management systems. However, by using the Internet connectivity, with modern secure socket sessions, those connections are easily established and used for unique interoperability solutions between external data management and the system's internal registry that work to everyone's benefit.

The system comprises 11 functional modules distributed among a registry cloud environment, a user's data-management environment, and a browser/internet environment.

Data contributors may access the system via the internet but may not progress further without first meeting user qualifications and receiving a unique, identifying access code. The study and data registry is an internet-accessible platform that hosts a DNS-based trust registry for findable, accessible, interoperable, reusable and analyzable scientific data sets and describes the data but does not host the data. The trust aspect relies on a trust-profile issued to the data contributor within the DNS architecture based on identity, a quality control assessment and reusability ratings of the datasets.

As was said of the early local-area network, its value grows with the number of connections. Here, the value of this system grows with the size of its qualified registry of dataset metadata files. Thus, the early emphasis is on data contributors who help to increase the value of the system to all users.

Data contributors are allowed access by virtue of predetermined qualifications. Once so qualified, they prepare their datasets for the system's quality-control process. The metadata for their quality-controlled datasets is placed in the registry subsystem where it is now open to discovery and associated functions (e.g. permissions, funding, and collaboration). It is also put in portable format.

Dataset seekers must also meet predetermined qualifications. Having done so, they may now access the metadata database to discover metadata and respective datasets of interest. Again, the system may also provide associated functions for permissions, funding and collaboration.

FIG. 1 shows an embodiment of the system and the separate modules distributed among the registry environment, user's data-management environment, and browser/internet environment. The functional modules in the registry environment (101) may be implemented in the cloud, and thereby can interoperate with external systems and their functions. Three modules are hosted within a user's data-management environment (102) and three modules are in the browser/internet environment (103).

The modules comprising the invention functions hosted in the registry environment are:
    a study/data profiler;
    an indexing and query engine;
    scored study/data profiles and metadata portable formatting module (MPFM);
    a profile and QC results metadata database (e.g. a metabase); and
    study/data registry publisher
These are shown as 101 in FIG. 1.

The functions of each module are as follows:

The study/data profiler is operative to organize, annotate, and present research data from one study, extracting key metrics, metadata, and relevant attributes, and generating comprehensive profiles for searching and discovery. This module integrates with the scored study/data profile and MPFM module, applies standardized methodologies, and leverages AI-driven insights to enhance data interpretation, ensuring accessibility, accuracy, and promoting collaboration among researchers.

The indexing and query engine is operative to organize metadata to support complex queries, allowing users to filter and explore studies and metadata by criteria such as research topic, methodology, population demographics, or data quality, ensuring rapid access to relevant information and fostering cross-study comparisons and data discovery. The steps it undertakes are:
    assigning a unique identifier by generating a unique uniform resource locator (URL) for the study metadata and associated dataset metadata, such as a Digital Object Identifier (DOI) or a URL;
indexing MPFM formatted data objects
indexing metadata in the profile and QC results metabase;
making metadata publicly accessible by providing a mechanism for users to search, discover, and access the metadata; and
linking metadata to data by providing a link to the actual data files, allowing users to locate and download the data.

The scored study/data profile and MPFM module is operative to format metadata for portability and interoperability supporting study reproducibility. This module formats the QC report into a MPFM-formatted object, making it available for interoperable review and query interrogation by tagging the object for search-engine optimization and study cataloging and indexing it, via the indexing and query engine, for insertion into the registry's internal store, the profile and QC results metabase. This module also extracts information for the study/data profiles QC template store, a module hosted within the user's data-management environment.

The profile and QC results metabase is operative to storing study/data QC profiling results.

The study/data registry publisher is operative to meta-tag an abstract of the study and data information and make it available via universal resource locators (URLs) and publicly accessible via the solution platform's domain-name service (DNS) zones.

The three modules hosted within the user's data-management environment are: the user interface for QC, the study/data profiles QC template store, and the QC engine.

The user interface for QC is operative to providing access to the QC engine within the user's data management environment.

The study/data profiles QC template store is operative to store, retrieve, and manage standardized QC templates that apply pre-defined rules and parameters for evaluating the quality of study data. This store automatically assigns appropriate QC templates based on study characteristics, performs template-driven assessments, and tracks compliance with data quality standards, ensuring consistent and reproducible evaluations across different datasets and studies. The study/data profile QC templates are used in AI processes, to extract optimal data characteristics for specific studies or data types.

The QC engine is operative to evaluate data quality by assessing the accuracy, completeness, and consistency of the data against predefined criteria in the study/data profiles QC template store. It does so by using AI-guided data validations that verify that the data adheres to established standards and guidelines, ensuring compatibility with other systems and tools. It identifies and guides the user in correcting errors by detecting and reporting errors, inconsistencies, and/or anomalies in the data. It generates quality reports by producing detailed reports summarizing the results of quality control assessments, including metrics for accuracy, completeness, and interoperability. And, it assigns a quality control score by assigning a numerical score or rating to the data based on its overall quality, providing a quantitative measure of its suitability for sharing and analysis.

The three modules hosted within the browser/internet environment are: the user interface for study/data registration, the user interface for data discovery and query access, and registry entries exposed via DNS.

The user interface for study/data registration is operative to register information about a study that generates or reuses data.

The user interface for data discovery and query access is operative to search and find metadata about studies or data The registry entries exposed via DNS is operative to make publicly accessible via URL(s) the meta-tagged abstract of studies.

The quality-control function in this system is unique in the context of a centralized registry for scientific metadata. Without having a context for the metadata based on a project's scope, a dataset seeker would not know the datasets level of completeness. As such, based on the project scope, the QC engine and its related functional modules, provides a view of dataset completeness and a score of same. This can provide a dataset seeker with invaluable information about a dataset and is believed to be a key, novel, element of the invention.

Figure 2:
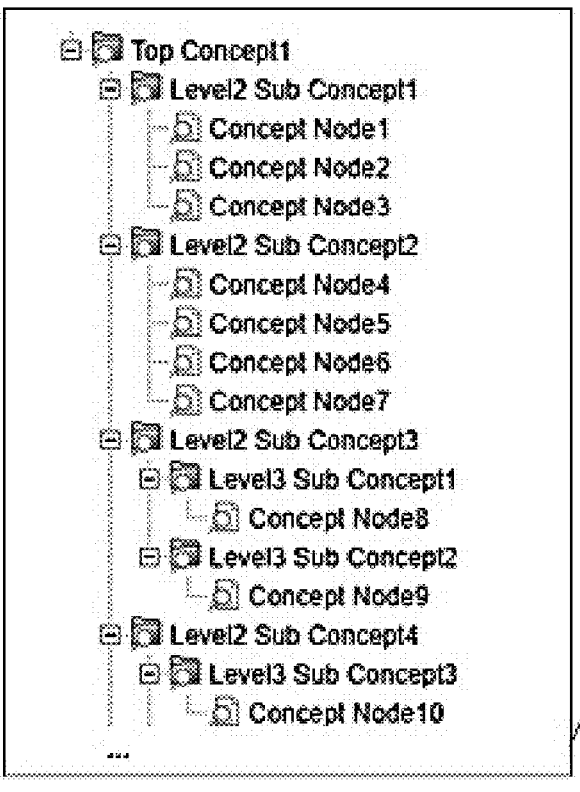
FIG. 2 shows an exemplary quality-control record for data to be contributed.

FIG. 2 shows a hierarchy for a project called "Concept 1" wherein concepts and sub-concepts are listed out based on a project's scope.

Figure 3:
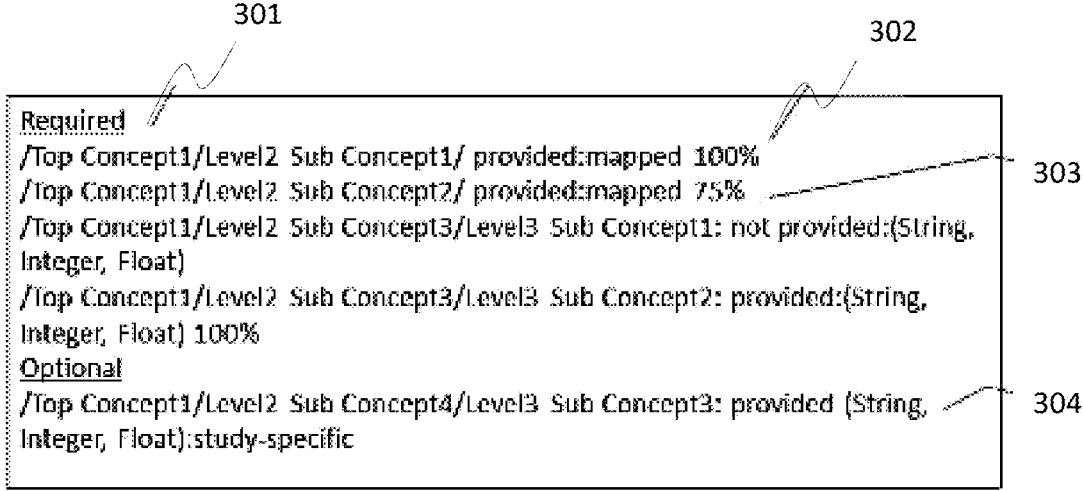
FIG. 3 shows an exemplary quality-control score for a data contribution.

FIG. 3 shows the dataset's levels of completion showing what are required (301) and the degrees of completeness of sub-concepts (302 and 303). It also shows optional aspects of the project scope (304).

Figure 4:
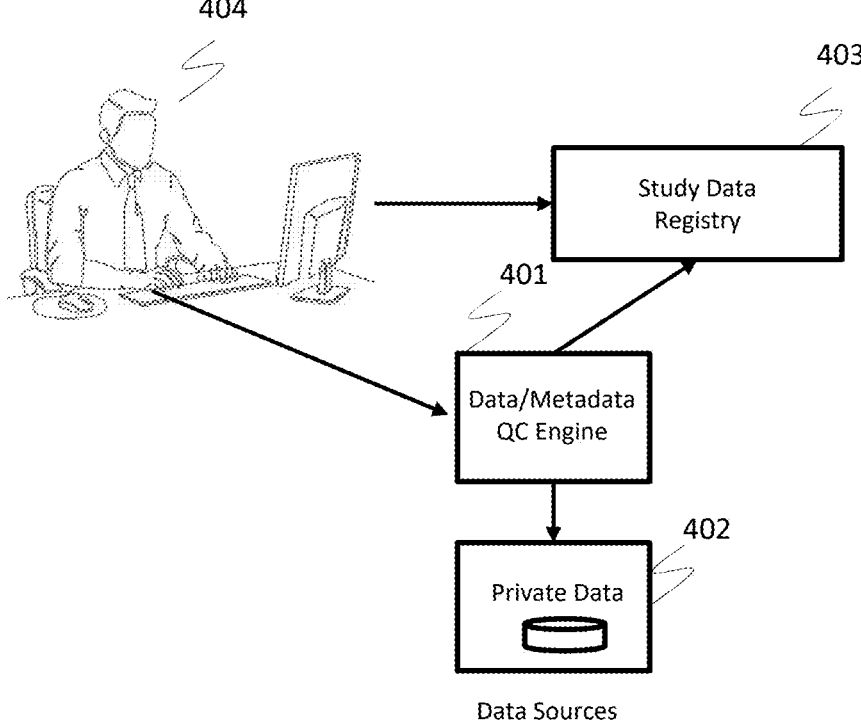
FIG. 4 shows an embodiment of how a data contributor interfaces with the registry and related systems.

FIG. 4 shows a dataset contributor's (404) interactions with the system and external environment. The contributor's entry is via the study data registry (403). The datasets to be contributed are in the contributor's private data management subsystem and may have a copy in a public data store (402). The contributor performs data/metadata QC on the data (401), and once it is quality checked, the result of the data/metadata QC process as pre-formatted metadata is moved to the study data registry (403).

Figure 5:
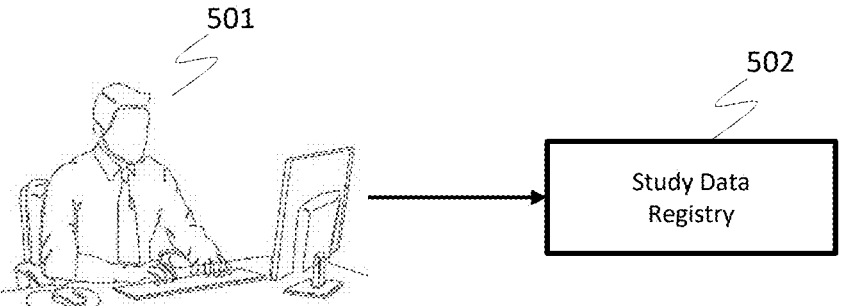
FIG. 5 shows an embodiment of how a data consumer interfaces with the system.

A dataset seeker (501) as shown in FIG. 5 can access the registry (502), pass through the qualifications gate, and have the opportunity to seek out needed datasets based on the registry's quality-controlled, dataset, metadata, including QC information about the dataset. Once metadata and its associated datasets are discovered, the dataset seeker may now propose funding and/or collaboration directly to the data owner. The data seeker may download study and data metadata that is formatted for portability by the Metadata Portable Format Module (MPFM).

Figure 6:
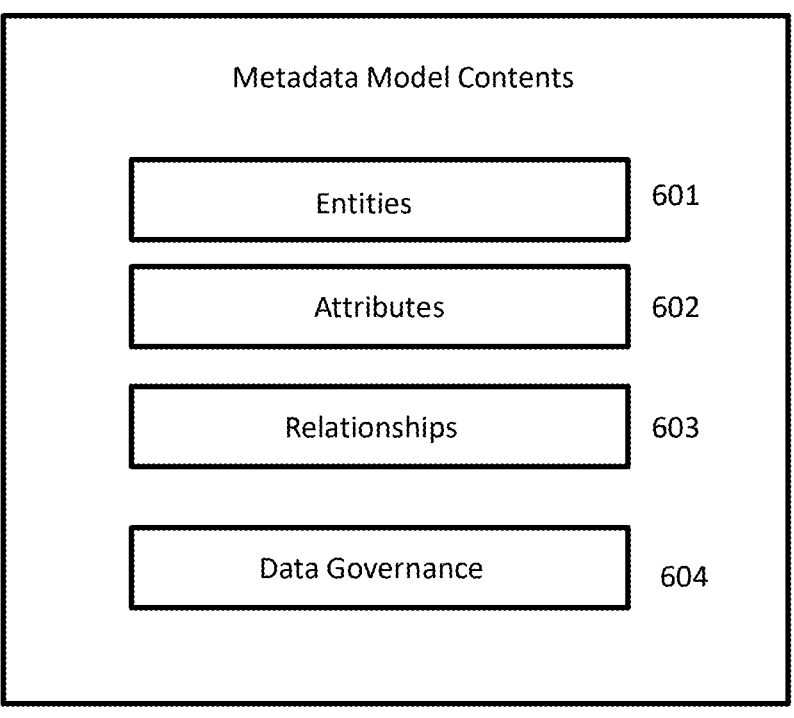
FIG. 6 shows an exemplary metadata model and the elements it comprises.

Metadata plays a huge role in this system. In this case, as shown in FIG. 6, metadata contents comprise entities (601), attributes (602), relationships (603) and, where pertinent, data governance (604). Entities comprise the basic units of information in the metadata, such as studies, datasets, samples, experiments, individuals and quality-control report and score. Attributes comprise the properties or characteristics of entities, such as title, description, keywords, publication date, and author information. Relationships comprise the connections between entities, such as "is part of," "has version," or "is related to." When a data registry stores information about data governance, it means that it contains metadata related to the policies, procedures, and standards that govern the collection, use, sharing, and protection of the data. These may comprise data ownership, access controls, data retention polices, and data security measures.

Figure 7:
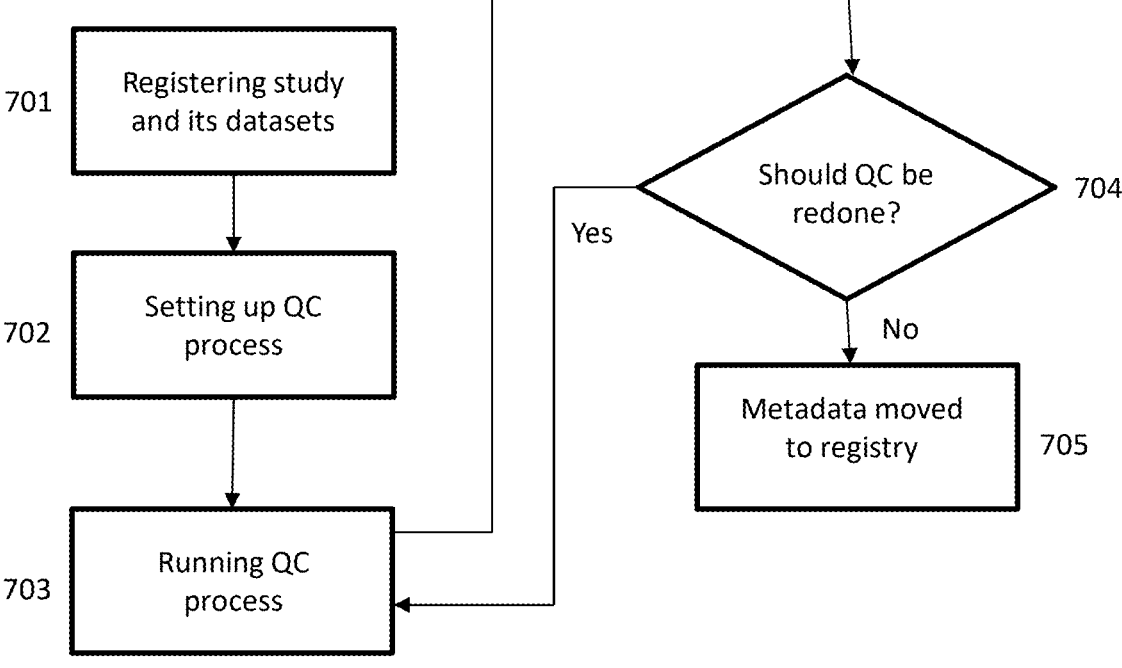
FIG. 7 shows exemplary method steps for data contribution.

FIG. 7 shows an exemplary method for contributing a dataset's metadata to the system registry. After passing through the qualifications gate, the dataset contributor registers the information about the study that generated the dataset (701). The contributor prepares the study data/metadata for the QC process (702), then the system runs the QC process on the study data (703). Next, a conditional step (704) is included whereby the contributor decides if the QC process is repeated to improve the QC score, guided by the QC report to improve the data quality by cleaning or annotating it, or if the QC metadata and score are registered in the registry (705). At the end of the method shown in FIG. 7, the quality-controlled dataset's metadata is in the registry and is subject to discovery and associated functions.

The drawings and descriptions are all meant to be exemplary of one or more embodiments of the system, and should not be read as limiting the scope of claims.

What is claimed is:

1. A computer-implemented system comprising:
one or more processors and memory storing instructions; and distributed functional modules executed by the one or more processors and comprising:
an indexing and query engine;
a study/data profiler module;
a scored study/data profiles and metadata portable formatting module (MPFM) module;
a profile and guality-control (QC) results metabase;
a study/data registry publisher;
a study/data QC profiles template store;
a QC engine;
a user interface for QC;
a user interface for study/data registration;
a user interface for data discovery and query access; and
a registry entries exposed via domain name server (DNS) module;
wherein the user interface for QC, the study-data QC profiles template store, and the QC engine execute as a QC subsystem within an external data-management environment in which datasets reside, and the study-data profiler, the indexing and query engine, the scored study-data profiles and MPFM module, the profile and QC results metabase, and the study-data registry publisher execute as a registry subsystem in a registry cloud enVironment remote from the external data- management environment;
wherein the QC subsystem, in the external data-management environment, applies template-driven QC validations selected from the study-data QC profiles template store to datasets of a registered study to produce QC results comprising a QC report and a quantitative QC score, and the QC engine establishes a secure, encrypted session socket to the scored study-data profiles and MPFM module in the registry cloud environment to transmit the QC results;
wherein the scored study-data profiles and MPFM module, in cooperation with the indexing and query engine and the profile and QC results metabase, generates an MPFM-formatted, portable metadata object for the study that encodes study and dataset attributes and includes the QC report and the quantitative QC score, and indexes the MPFM-formatted, portable metadata object in the profile and QC results metabase for discovery based on the encoded attributes and QC assessment; and
wherein the user interface for study-data registration, the user interface for data discovery and query access, the study-data registry publisher, and the registry-entries-exposed-via-DNS module: support registering studies and associated datasets in the registry cloud environment while maintaining the datasets hosted in the external data-management environment; publish a meta-tagged abstract and a DNS-based trust profile for the study and its datasets, the trust profile reflecting contributor identity, QC assessment, and dataset reusability ratings, such that the meta- tagged abstract and DNS-based trust profile are publicly discoverable via URLs and DNS while the datasets remain externally hosted; and enable, via the user interface for data discovery and query access, searching and discovering registered studies using the indexed MPFM-formatted, portable metadata objects and initiating or responding to access, collaboration, or communications relating to discovered studies or datasets.

2. The system as in claim 1 wherein:

the indexing and query engine indexes, in the profile and QC results metabase, MPFM-formatted, portable metadata objects and associated study and dataset metadata to support discovery of studies and datasets based on study attributes, dataset characteristics, contributor identity, and QC assessment.

3. The system as in claim 1 wherein:

organizes and annotates research data for a registered study, extracting key study-level and dataset-level metrics and metadata and generating study-data profiles that are supplied to the scored study-data profiles and MPFM module for inclusion in the MPFM-formatted, portable metadata objects.

4. The as in claim 1 wherein the scored study-data profiles and MPFM module: formats and annotates metadata objects for search-engine tagging and registry cataloging; generates the MPFM-formatted, portable metadata objects to encapsulate study and dataset attributes, QC reports, and QC scores; and updates the study-data QC profiles template store based on study and data types processed so that subsequent QC validations are adapted to prior registry experience.

5. The system as in claim 1 wherein the profile and QC results metabase stores and maintains MPFM-formatted, portable QC objects and study metadata as entries that are distinct from underlying datasets and that are indexed by the indexing and query engine to support queries over study attributes, dataset characteristics, QC scores, and trust-related parameters.

6. The system as in claim 1, wherein the study-data registry publisher creates a meta-tagged abstract of a study and its datasets for publication.

7. The system as in claim 1 wherein:

the user interface for QC, the QC Engine, and the study/data profiles QC template store execute as a subsystem within the external data-management environment.

8. The system as in claim 1, wherein the QC engine: evaluates data quality, validates interoperability, identifies and corrects errors, generates QC reports, and calculates a QC score; and establishes the secure, encrypted session socket to the scored study-data profiles and MPFM module.

9. The system as in claim 1, wherein the study-data QC profiles template store manages standardized QC templates comprising predefined rules and parameters.

10. The system as in claim 1, wherein the user interface for QC guides users to run QC within the external data-management environment.

11. The system as in claim 1, wherein the user interface for study-data registration guides registering a study with datasets.

12. The system as in claim 1, wherein the user interface for data discovery and query access: guides searching or discovering data; initiates communication, or collaboration requests; and supports replies to received requests.

13. The system as in claim 1, wherein the registry-entries-exposed-via-DNS module exposes study and data metadata via the Internet.

14. A computer-implemented method executed by one or more processors comprising registering, via a user interface for study-data registration and a study-data registry publisher in a registry cloud environment, studies and associated datasets for the registry cloud environment while maintaining the datasets in an external data-management environment;

setting up, within the external data-management environment, a QC subsystem comprising a QC engine, a user interface for QC, and a study-data-QC profiles template store to select template-driven QC validations based on study or dataset characteristics;

running, by the QC engine in the external data-management environment, the QC validations on at least one dataset of a registered study to produce QC results comprising a QC report and a quantitative QC score;

establishing, by the QC engine, a secure, encrypted session socket to a scored study-data profiles and metadata portable formatting (MPFM) module in the registry cloud environment and transmitting the QC results to the MPFM module;

generating, by the MPFM module in cooperation with an indexing and query engine and a profile and QC results metabase, an MPFM-formatted, portable metadata object for the registered study that encodes study and dataset attributes and includes the QC report and the quantitative QC score, and indexing the MPFM-formatted, portable metadata object in the profile and QC results metabase for discovery;

publishing, by the study-data registry publisher and a registry-entries-exposed-via-domain-name-system (DNS) module, a meta-tagged abstract and a DNS-based trust profile for the registered study and its datasets, the DNS-based trust profile reflecting contributor identity, QC assessment, and dataset reusability ratings, the meta-tagged abstract and DNS-based trust profile being publicly discoverable via URLs and DNS while the datasets remain hosted in the external data-management environment; and facilitating, via a user interface for data discovery and query access, discovery of the registered study based on the indexed MPFM-formatted, portable metadata object and initiating or responding to communications relating to the discovered study or dataset.

15. The method as in claim 14 wherein selecting the template-driven QC validations based on study or dataset characteristics comprises updating one or more templates in the study-data QC profiles template store in response to prior QC results for related studies or datasets, and subsequently selecting QC validations according to the updated templates.

16. The method as in claim 14 wherein generating the MPFM-formatted, portable metadata object comprises encapsulating, in the object, study and dataset attributes, the QC report, and the quantitative QC score without including the underlying datasets, such that the MPFM-formatted, portable metadata object is distinct from the underlying datasets.

17. The method as in claim 14 wherein indexing the MPFM-formatted, portable metadata object in the profile and QC results metabase comprises storing the MPFM-formatted, portable metadata object as a registry entry that is separate from any data store containing the underlying datasets and indexing the registry entry for queries over study attributes, dataset characteristics, QC scores, and trust-related parameters.

18. The method as in claim 14 wherein the DNS-based trust profile published for the registered study references the MPFM-formatted, portable metadata object in the profile and QC results metabase while the datasets remain hosted in the external data-management environment.

19. The method as in claim 14 wherein:

publishing the metadata on the internet for public discovery comprises:

making a meta-tagged abstract of a study and its data via its metadata available via URLs and publicly accessible via the solution platform's DNS zones;

providing a user interface for study/data discovery & query access; and providing a user interface for communications related to the discoyered study/data.

* * * * *